(12) United States Patent
Shimogori

(10) Patent No.: US 7,720,866 B2
(45) Date of Patent: May 18, 2010

(54) DATA-GENERATION SUPPOPRTING SYSTEM, DATA-GENERATION SUPPORTING APPARATUS, AND COMPUTER PROGRAM PRODUCT

(75) Inventor: Yumiko Shimogori, Kanagawa (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 277 days.

(21) Appl. No.: 11/604,979

(22) Filed: Nov. 28, 2006

(65) Prior Publication Data

US 2007/0156795 A1 Jul. 5, 2007

(30) Foreign Application Priority Data

Nov. 29, 2005 (JP) ............................. 2005-344189

(51) Int. Cl.
G06F 7/00 (2006.01)
G06F 17/30 (2006.01)
(52) U.S. Cl. .................... 707/791; 707/797; 715/221; 715/235; 715/231
(58) Field of Classification Search .................. 707/200
See application file for complete search history.

(56) References Cited

U.S. PATENT DOCUMENTS

| | | | |
|---|---|---|---|
| 7,197,479 B1 * | 3/2007 | Franciscus de Heer et al. | 705/27 |
| 2002/0116298 A1 * | 8/2002 | Kamon et al. | 705/27 |
| 2003/0050859 A1 * | 3/2003 | Rodriguez et al. | 705/27 |
| 2003/0220893 A1 | 11/2003 | Dettinger et al. | 707/1 |
| 2005/0004918 A1 | 1/2005 | Platt | 707/100 |
| 2007/0255631 A1 * | 11/2007 | Schmidt et al. | 705/27 |

FOREIGN PATENT DOCUMENTS

| | | |
|---|---|---|
| JP | 09-305453 | 11/1997 |
| JP | 10 207951 | 8/1998 |
| JP | 2000-123034 | 4/2000 |
| JP | 2000-222457 | 8/2000 |
| JP | 2000-306002 | 11/2000 |
| JP | 2001-297232 | 10/2001 |
| JP | 2001-519938 | 10/2001 |

(Continued)

OTHER PUBLICATIONS

European Search Report dated Jul. 31, 2007 from corresponding application No. 06024519.8.

(Continued)

Primary Examiner—Don Wong
Assistant Examiner—Binh V Ho
(74) Attorney, Agent, or Firm—Ohlandt, Greeley, Ruggiero & Perle, L.L.P.

(57) ABSTRACT

A data-generation supporting system includes an template generating unit that generates a document type template from metadata for inputting a combination, the metadata defining a class and properties indicating attributes of an instance belonging to the class; a combination-information generating unit that receives a combination of constituent elements of the properties based on the generated document type template through an input unit, and that generates combination information; and a combination expanding unit that generates contents data using a function of calculating a direct product of the properties of the generated combination information, and using a function of performing a calculation of the constituent elements of the properties and a character-string combination of the constituent elements of the properties.

8 Claims, 11 Drawing Sheets

FOREIGN PATENT DOCUMENTS

| | | |
|---|---|---|
| JP | 2002-063200 | 2/2002 |
| JP | 2003-091535 | 3/2003 |
| JP | 2003-187134 | 7/2003 |
| JP | 2004-302684 | 10/2004 |
| JP | 2005-049943 | 2/2005 |
| JP | 2005-250699 | 9/2005 |
| JP | 2005-284501 | 10/2005 |
| JP | 2005-293134 | 10/2005 |
| JP | 2005-316585 | 11/2005 |

OTHER PUBLICATIONS

Japanese Search Report dated Nov. 4, 2009 from corresponding application No. 2005-344189.

* cited by examiner

FIG.8

| PROPERTYBSU | P0001 | P0002 | P0003 | P0004 | P0005 | P0006 |
|---|---|---|---|---|---|---|
| PREFERRED_NAME | PRODUCT_CODE | CPU | MEMORY | PRICE | OS | RAID |
| DATATYPE | STRING_TYPE | NON_QUANTITATIVE_CODE | NON_QUANTITATIVE_CODE | REAL_CURRENCY_TYPE | STRING_TYPE | NON_QUANTITATIVE_CODE |
| UNIT |  |  |  | JPY |  |  |
| VALUE_FORMAT | M.512 | M.18 | M.18 | NR2 S.7.5 | M.512 | M.18 |
| KEY |  |  |  |  |  |  |

FIG. 9

| | P0001 | P0002 | P0003 | P0004 | P0005 | P0006 | |
|---|---|---|---|---|---|---|---|
| | PRODUCT_CODE | CPU | MEMORY | PRICE | OS | RAID | |
| | STRING_TYPE | NON_QUANTITA-TIVE_CODE | NON_QUANTITA-TIVE_CODE | REAL_CURRENCY_TYPE JPY | STRING_TYPE | NON_QUANTITA-TIVE_CODE | |
| | M.512 | M.18 | M.18 | NR2 S.7.5 | M.512 | M.18 | |
| G1 | P4 | pentium 4 | | 20000 | | | LINE 1 |
| G1 | PM | pentium M | | 18000 | | | LINE 2 |
| G1 | CD | celeron D | | 10000 | | | LINE 3 |
| G1 | A64 | Athlon 64 | | 16000 | | | LINE 4 |
| G1 | A64FX | Athlon 64FX | | 18000 | | | LINE 5 |
| G2 | 128 | | 128 | 4000 | | | LINE 6 |
| G2 | 256 | | 256 | 6000 | | | LINE 7 |
| G2 | 512 | | 512 | 8000 | | | LINE 8 |
| G2 | 1G | | 1012 | 10000 | | | LINE 9 |
| G3 | | | | | Red Hat Linux 4 (32bit) | | LINE 10 |
| G3 | | | | | Red Hat Linux 4 (64bit) | | LINE 11 |
| G3 | | | | | Windows Server 2003 SP1 | | LINE 12 |
| G3 | | | | | Windows Server 2003 std x64 | | LINE 13 |
| G3 | | | | | Windows XP | | LINE 14 |
| G3 | | | | | — | | LINE 15 |
| G4 | | | | | | — | LINE 16 |
| G4 | | | | | | RAID 0 | LINE 17 |
| G4 | | | | | | RAID 1 | LINE 18 |
| G4 | | | | | | RAID 5 | LINE 19 |
| G4 | | | | | | RAID 0+1 | LINE 20 |

FIG.10

Generation rule current row

| Row Identifier | group name |
|---|---|
| LINE 17 | G4 | exception set

| Row identifier | group name |
|---|---|
| LINE 10 | G3 |
| LINE 11 | G3 |

▼ ▲

List of exception sets

| exception set condition |
|---|
| LINE 10, LINE 11 |
|  |

Set   Cancel

FIG.12

| P0001 | P0002 | P0003 | | P0004 | | P0005 | | P0006 | |
|---|---|---|---|---|---|---|---|---|---|
| PRODUCT_CODE | CPU | MEMORY | | PRICE | | OS | | RAID | |
| STRING_TYPE | NON_QUANTITATIVE_CODE | NON_QUANTITATIVE_CODE | | REAL_CURRENCY_TYPE | | STRING_TYPE | | NON_QUANTITATIVE_CODE | |
| | | | | JPY | | | | | |
| M.512 | M.18 | M.18 | | M.18 | | M.512 | | M.18 | |
| P4128 | pentium 4 | | 128 | | 24000 | Wondows Server 2003 SP1 | | RAID 0 | |
| P4256 | pentium 4 | | 256 | | 26000 | Wondows Server 2003 SP1 | | RAID 0 | |
| P4512 | pentium 4 | | 512 | | 28000 | Wondows Server 2003 SP1 | | RAID 0 | |
| P41G | pentium 4 | | 1012 | | 30000 | Wondows Server 2003 SP1 | | RAID 0 | |
| PM128 | pentium M | | 128 | | 22000 | Wondows Server 2003 SP1 | | RAID 0 | |
| PM256 | pentium M | | 256 | | 24000 | Wondows Server 2003 SP1 | | RAID 0 | |
| PM512 | pentium M | | 512 | | 26000 | Wondows Server 2003 SP1 | | RAID 0 | |
| PM1G | pentium M | | 1012 | | 28000 | Wondows Server 2003 SP1 | | RAID 0 | ←15 |
| CD128 | coleron D | | 128 | | 14000 | Wondows Server 2003 SP1 | | RAID 0 | |
| CD256 | coleron D | | 256 | | 16000 | Wondows Server 2003 SP1 | | RAID 0 | |
| CD512 | coleron D | | 512 | | 18000 | Wondows Server 2003 SP1 | | RAID 0 | |
| CD1G | coleron D | | 1012 | | 20000 | Wondows Server 2003 SP1 | | RAID 0 | |
| A64128 | Athlom 64 | | 128 | | 20000 | Wondows Server 2003 SP1 | | RAID 0 | |
| A64256 | Athlom 64 | | 256 | | 22000 | Wondows Server 2003 SP1 | | RAID 0 | |
| A64512 | Athlom 64 | | 512 | | 24000 | Wondows Server 2003 SP1 | | RAID 0 | |
| A641G | Athlom 64 | | 1012 | | 26000 | Wondows Server 2003 SP1 | | RAID 0 | |
| A64FX128 | Athlom 64FX | | 128 | | 22000 | Wondows Server 2003 SP1 | | RAID 0 | |
| A64FX256 | Athlom 64FX | | 256 | | 24000 | Wondows Server 2003 SP1 | | RAID 0 | |
| A64FX512 | Athlom 64FX | | 512 | | 26000 | Wondows Server 2003 SP1 | | RAID 0 | |
| A64FX1G | Athlom 64FX | | 1012 | | 28000 | Wondows Server 2003 SP1 | | RAID 0 | |
| P4128 | pentium 4 | | 128 | | 24000 | Red Hat Lonux 4 (64bit) | | — | |
| P4256 | pentium 4 | | 256 | | 26000 | Red Hat Lonux 4 (64bit) | | — | |

DATA-GENERATION SUPPOPRTING SYSTEM, DATA-GENERATION SUPPORTING APPARATUS, AND COMPUTER PROGRAM PRODUCT

CROSS-REFERENCE TO RELATED APPLICATIONS

This application is based upon and claims the benefit of priority from the prior Japanese Patent Application No. 2005-344189, filed on Nov. 29, 2005; the entire contents of which are incorporated herein by reference.

BACKGROUND OF THE INVENTION

1. Field of the Invention

The present invention generally relates to a data-generation supporting system, a data-generation supporting apparatus, and a computer program product.

2. Description of the Related Art

In a catalog such as a paper medium or a PDF file in which specifications of many industrial products or parts (instances) are described, property values of the parts slightly differ from one another (for example, thermometers slightly differ in measurement temperature range from one another). In the catalog, combinations of the property values are described in a matrix form so that product or part codes for identifying the respective products or parts (instances) are uniquely assigned to the products or parts according to each of the combinations.

Furthermore, the combinations in the matrix form are often stored as they are and expanded when the combinations are displayed toward a user.

Meanwhile, if it is necessary to add accessory information (e.g., a term of validity) to each of the combinations, it is preferable to do so after the combinations in the matrix form are expanded, and to store the expanded combinations, to which the accessory information is added, in a contents database. However, a data amount of the expanded combinations becomes considerably large, disadvantageously resulting in heavy burden on a user (data-generation person). Furthermore, if the combinations in the matrix form are expanded, nonexistent combinations (exceptions) are often present. In addition, a method of assigning the product or program codes to the respective products or program differs among industries or companies. Due to this, it is disadvantageously necessary to perform operation exceeding simple combinations in the matrix form.

To solve the problems, a method of generating data by using a description rule of "If... then... else..." is proposed as disclosed in, for example, JP-A 2000-222457.

However, if exceptions are removed using the description rule of "If... then... else...", product codes are generated, and contents data is finally generated, it is disadvantageously necessary for the user to acquire skill in the description rule.

Moreover, to expand the existent description rule, it is disadvantageously required to verify combinations of description rules.

SUMMARY OF THE INVENTION

According to one aspect of the present invention, a data-generation supporting system includes an template generating unit that generates a document type template from metadata for inputting a combination, the metadata defining a class and properties indicating attributes of an instance belonging to the class; a combination-information generating unit that receives a combination of constituent elements of the properties based on the generated document type template through an input unit, and that generates combination information; and a combination expanding unit that generates contents data using a function of calculating a direct product of the properties of the generated combination information, and using a function of performing a calculation of the constituent elements of the properties and a character-string combination of the constituent elements of the properties.

According to another aspect of the present invention, a data-generation supporting apparatus includes a metadata acquiring unit that acquires metadata from a server connected to the data-generation supporting apparatus via a network, the metadata defining a class and properties indicating attributes of an instance belonging to the class; an template generating unit that generates a template from the acquired metadata for inputting a combination; a combination-information generating unit that receives a combination of constituent elements of the properties based on the generated document type template through an input unit, and that generates combination information; a combination expanding unit that generates contents data by calculating a direct product of the properties of the generated combination information, and by performing a calculation of the constituent elements of the properties and a character-string combination of the constituent elements of the properties; and a contents data transferring unit that transfers the generated contents data to the server.

A computer program product according to still another aspect of the present invention causes a computer to perform the method according to the present invention.

BRIEF DESCRIPTION OF THE DRAWINGS

FIG. 8 is a front view showing an example of a template displayed in a display unit;

FIG. 9 is a front view showing an example of combination information of a property-value constituent-element displayed in the display unit;

FIG. 10 is a front view showing an example of a GUI for designating a row ID that meets exception conditions of the combination information of the property-value constituent-element;

FIG. 12 is a front view showing an example of contents data generated by the combination expanding unit based on the example of the combination information of the property-value constituent-element shown in FIG. 9.

DETAILED DESCRIPTION OF THE INVENTION

Exemplary embodiments of a data-generation supporting system, a data-generation supporting apparatus, and a computer program product according to the present invention will be explained hereinafter with reference to the accompanying drawings.

1. Hierarchical Dictionary

First of all, a hierarchical dictionary that is metadata used in an electronic catalog system that electronically provides product information as a prerequisite for the embodiments will be explained. The metadata means data for defining a description specification of the other data (e.g., contents data). In a database, the metadata is in the form of data in which information (e.g., a table name, an attribute name, and association) corresponding to a database schema is independently distributed as data. The metadata is distinguished from ordinary-value data. The metadata is referred to as "dictionary" or "data dictionary" according to ISO13584 standard, IEC61360 standard or the like.

Figure 1:
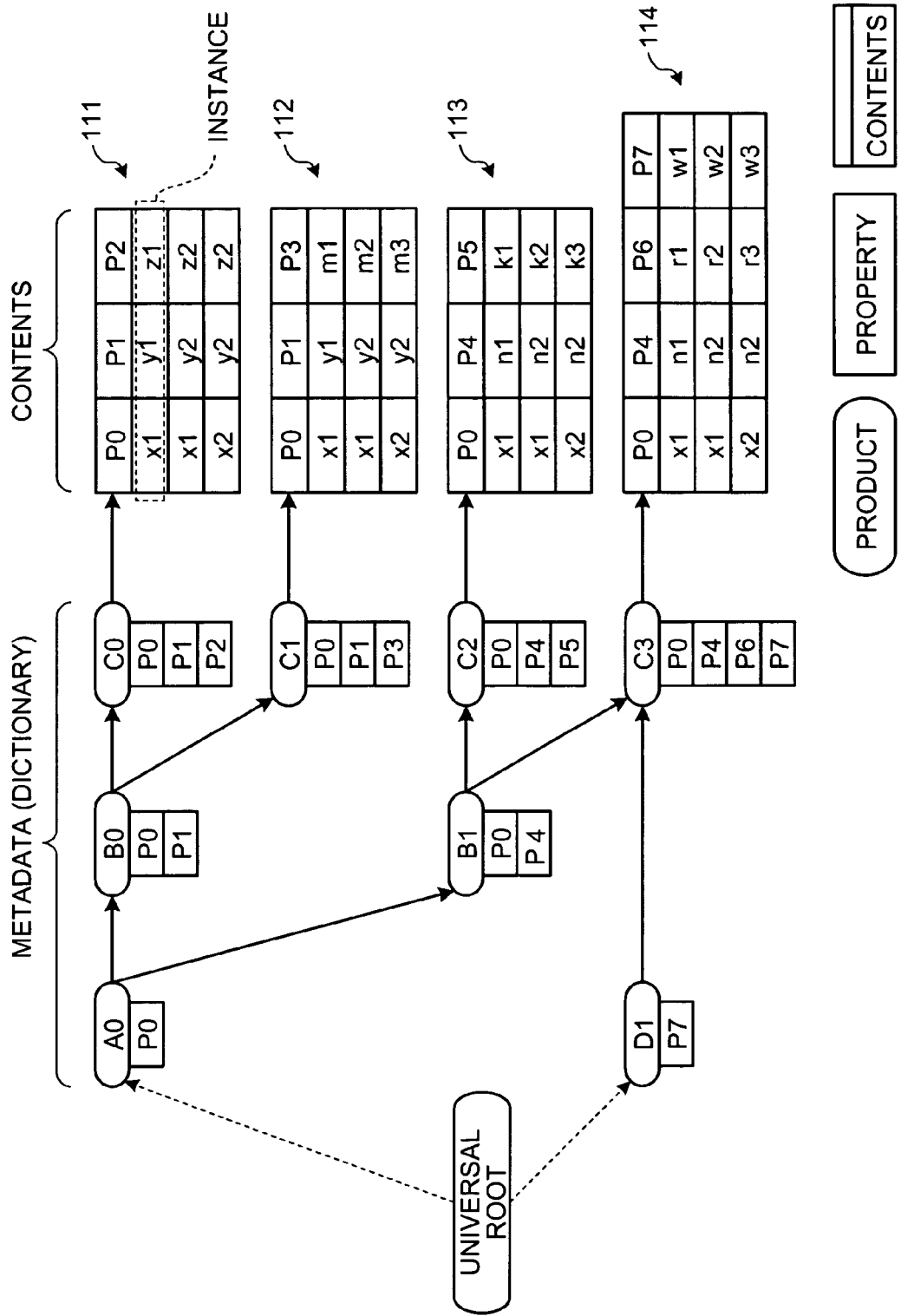
FIG. 1 is a schematic view of an example of a hierarchical dictionary as a prerequisite for an embodiment of the present invention.

FIG. 1 is a schematic view of an example of the hierarchical dictionary. The hierarchical dictionary or hierarchical database is the metadata and divided into a plurality of hierarchies. Each hierarchy includes one or two or more classification items, and has a character that a lower hierarchy inherits an attribute (a property) of a higher hierarchy. Accordingly, the attribute of each classification item of the lower hierarchy is inherited from the attribute of the classification item of the higher hierarchy. The classification item of each hierarchy is referred to as "class", and each of the class has an attribute characteristic of the class. The hierarchical dictionary shown in FIG. 1 depicts an attribute-inheritance relationship among ordinary classes including the relationship between attributes and multiple inheritance. In FIG. 1, the classes are denoted by reference symbols A0, B0, B1, C0, C1, C2, C3, and D1, and the attributes are denoted by reference symbols P0 to P7. The class C3 inherits the attributes P0 and P4 from one parent class B1, and the attribute P7 from the other parent class D1. The attribute P6 is an attribute independently defined in the class C3. The classes A0 and D1 are independent classes. A universal root is also referred to as "universal class" that virtually includes all root classes, and considered to correspond to "universal set" generally used in mathematics. Namely, the universal class does not inherit any attributes from the other root classes. Because of lack of attributes, the universal class can be dealt with as a parent class of all root classes.

According to the PLIB standard (ISO13584 parts Library), which is an international standard for packaging an electronic catalog system that electronically provides product information, a hierarchical structure used for classification of products and attributes of the products is a simple tree structure. Accordingly, only one superclass (parent class) is present. To inherit an attribute from a class other than the parent class, a special structure called "Case Of" for the import (citation) of the attribute is used. With the structure, the multiple inheritance shown in FIG. 1 can be dealt with by appropriately dividing parent classes into a main-series parent class and a sub-series parent class by, for example, defining the parent class having the smallest number as the main-series parent class, and assigning a different name of "Case Of" to the sub-series parent class. Furthermore, in an object-relational database (ORDB) or an ordinary object-oriented database (OODB), a parent table or a parent class is not necessarily present for all tables or classes. However, as shown in FIG. 1, by setting a virtual "universal root" for an independently existing table or class, it is possible to track all classes from only one root and to regard the structure similarly as the simple tree structure.

Figure 2:
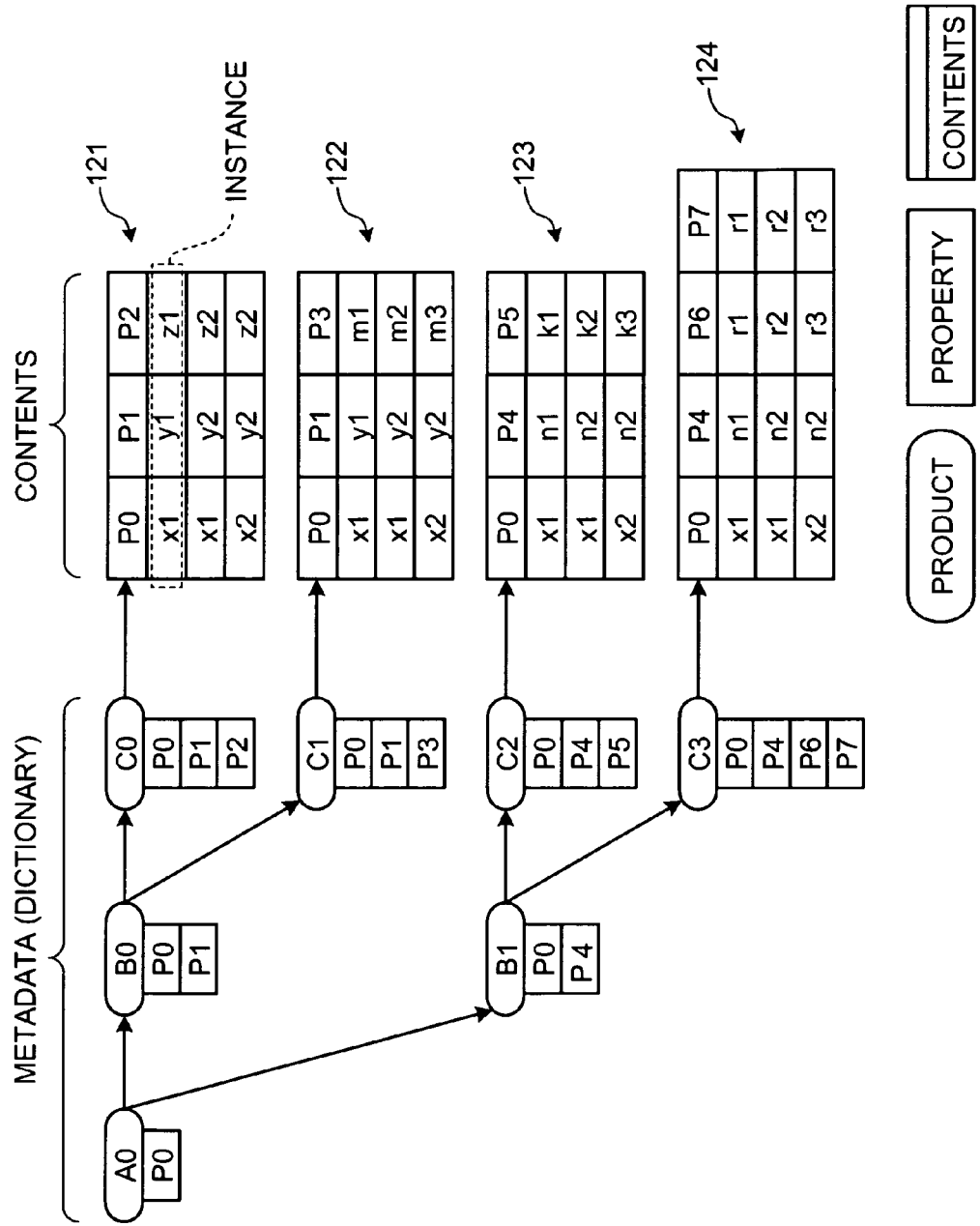
FIG. 2 is a schematic view of an example of a hierarchical dictionary according to the PLIB standard using a simple tree structure.

FIG. 2 is a schematic view of an example of a hierarchical dictionary according to the PLIB standard using the simple tree structure. The hierarchical dictionary according to the PLIB standard shown in FIG. 2 does not include a universal root. In FIG. 2, a tree-structure part of each of the classes A0, B0, B1, C0, C, and C2 expresses information including classification hierarchies. In the embodiment, the tree is a simple tree and only one superclass is present for each class.

In FIG. 2, subclasses of the class A0 are the classes B0 and B1, subclasses of the class B0 are the classes C0 and C1, and subclasses of the class B1 are the classes C2 and C3. The respective product classes A0, B0, B1, C0, C1, and C2 includes an attribute or attributes and the attribute or attributes of the superclass are inherited to the subclasses of the superclass. In FIG. 2, contents 121, 122, 123, and 124 are actual-product data groups. For example, the contents 121 are the product data group of the type C0. The contents 121 are contents data including three types. Namely, the contents 121 include x1 and x2 as attribute values of the attribute P0, y1 and y2 as attribute values of the attribute P1, and z1 and z2 as attribute values of the attribute P2. The contents 111 to 114 shown in FIG. 1 are similar in character to the contents 121 to 124 shown in FIG. 2.

2. System Configuration

Figure 3:
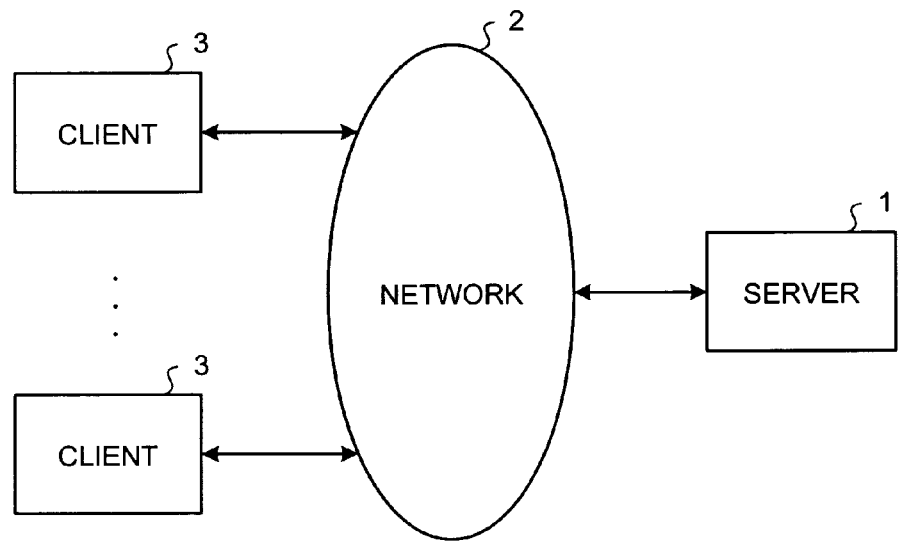
FIG. 3 is a schematic view of an example of constructing a data-generation supporting system including a data-generation supporting apparatus according to the embodiment.

FIG. 3 is a schematic view of a data-generation supporting system including a data-generation supporting. apparatus according to the embodiment. As shown in FIG. 3, the data-generation supporting system is assumed as a server-client system in which a plurality of client computers (hereinafter, "clients") 3 serving as data-generation supporting apparatuses are connected to a server computer 1 (hereinafter, "server") 1 via a network 2. The client 3 is an ordinary personal computer or the like.

Figure 4:
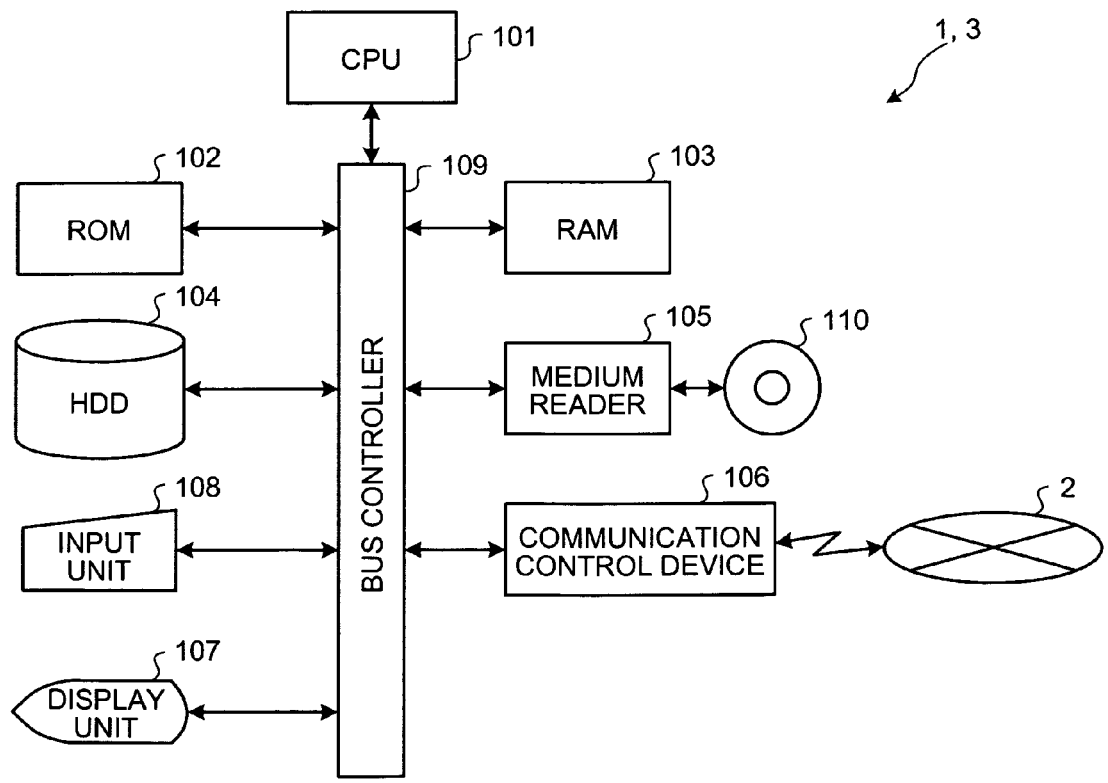
FIG. 4 is a module block diagram of each of a server and a client.

FIG. 4 is a module block diagram of the server 1 and the client 3. Each of the server 1 and the client 3 includes a central processing unit (CPU) 101, a read-only memory (ROM) 102, a random-access memory (RAM) 103, a hard disk drive (HDD) 104, a medium driving apparatus 105, a communication control apparatus 106, a display unit 107, an input unit 108, and the like. The CPU 101 performs an information processing. The ROM 102 stores therein such data as basic input/output system (BIOS). The RAM 103 stores therein various pieces of data in a rewritable fashion. The HDD 104 functions as various databases and stores therein various programs. The medium driving apparatus 105 such as a CD-ROM drive is a drive for storing information using a storage medium 110, distributing information to an outside, and acquiring information from the outside. The communication control apparatus 106 is an apparatus that transmits and receives information to and from an external computer through the network 2 by holding a communication with the external computer. The display unit 107, e.g., a cathode-ray tube (CRT) or a liquid crystal display (LCD), displays a processing progress, a processing result, and the like toward an operator. The input unit 108, e.g., a keyboard and a mouse, causes the operator to input a command, information, and the like to the CPU 101. Each of the server 1 and the client 3 operates while a bus controller 109 arbitrates the data transmitted or received among the respective constituent elements of the server 1 or the client 3.

When the operator (user) turns on the server 1 or the client 3, the CPU 101 activates a program called "loader" stored in the ROM 102, reads a program called "operating system (OS)" for managing computer hardware and software from the HDD 104 to the RAM 103, and starts the OS. The OS activates a program, reads information, or stores information according to user's operation. Typical or well-known examples of the OS are Windows (registered trademark) and UNIX (registered trademark). An operation program running on the OS is referred to as "application program". The application program is not limited to the program running on a predetermined OS but can control the OS to execute a part of various processing to be explained later. Alternatively, the application program can be included as a part of a set of program files that constitute predetermined application software, the OS, and the like.

The client 3 stores, as the application program, a data-generation supporting program in the HDD 104. In this sense, the HDD 104 acts as a storage medium that stores therein the data-generation supporting program.

On the other hand, the server 1 stores the application program that exhibits a server function in the HDD 104.

Generally, the operation program installed into the HDD 104 of the server 1 or the client 3 is recorded in the storage medium 110. Examples of the storage medium 110 includes optical disks such as a CD-ROM and a DVD, an magnetooptical disk, a magnetic disk such as a flexible disk, and a media such as a semiconductor memory. The operation program recorded in the storage medium 110 is installed into the HDD 104. Due to this, the storage medium 110 exhibiting mobility such as an optical-information recording media, e.g., a CD-ROM, or a magnetic media such as floppy disk (FD) can serve as a storage medium that stores therein the application program (data-generation supporting program). Alternatively, the application program (data-generation supporting program) can be acquired from the outside through, for example, the communication control device 106 and installed into the HDD 104.

When the data-generation supporting program running on the OS is active, the client 3 intensively controls the respective constituent elements by causing the CPU 101 to perform various calculation processing. Among the calculation processing performed by the CPU 101 of the client 3, characteristic processing according to the embodiment will be explained.

Figure 5:
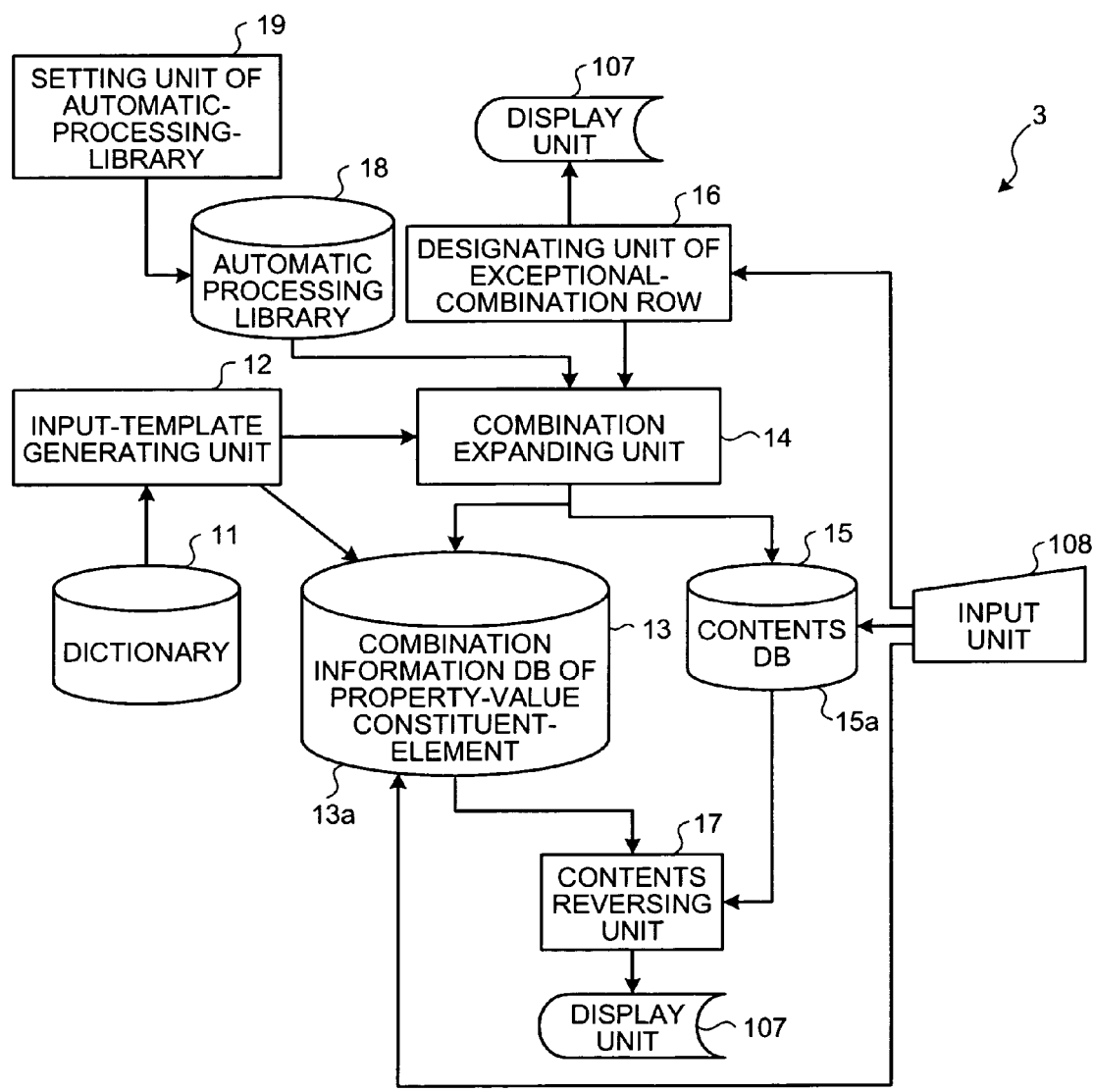
FIG. 5 is a block diagram of the client that serves as the data-generation supporting apparatus.

FIG. 5 is a block diagram of the client 3. The client 3 serving as the data-generation supporting apparatus includes a dictionary 11, an input-template generating unit 12, a combination information database (DB) 13a of a property-value constituent-element, a combination expanding unit 14, a contents DB 15a, a designating unit 16 of an exceptional-combination row, a contents reversing unit 17, an automatic processing library 18, and a setting unit 19 of an automatic processing library. The combination information DB 13a stores therein combination information 13 of a property-value constituent-element. The contents DB 15a stores therein contents data 15 in which a performance and a character of each of instances (products or parts) belonging to each product class or each part class are described.

Figure 6:
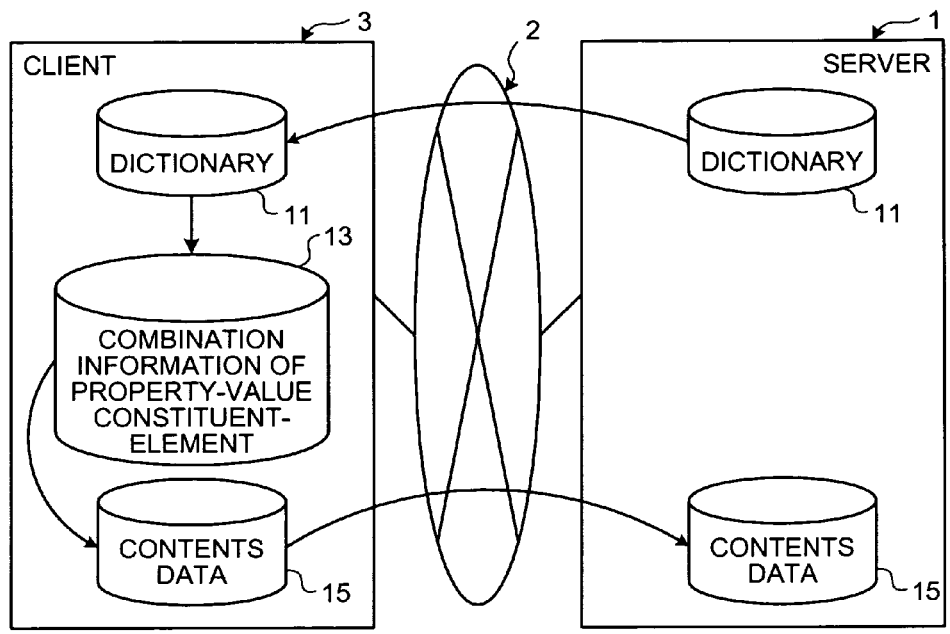
FIG. 6 is a schematic view of transmission and reception of data between the server and the client.

As shown in FIG. 6, the client 3 connected to the server 1 which manages the dictionary 11 and the contents data 15, via the network 2 can download the latest dictionary 11 from the server 1. A metadata acquiring unit is thereby realized. The client 3, which has downloaded the latest dictionary 11 from the server 1, generates the combination information 13 of the property-value constituent-element based on the latest dictionary 11, and generates the contents data 15 based on the combination information 13. The client 3 transmits the generated contents data 15 to the server 1. A contents data transferring unit is thereby realized. The server 1 registers the received contents data 15 in a DB.

Processing operations performed by the respective constituent elements of the server 1 and the client 3 will be explained.

Figure 7:
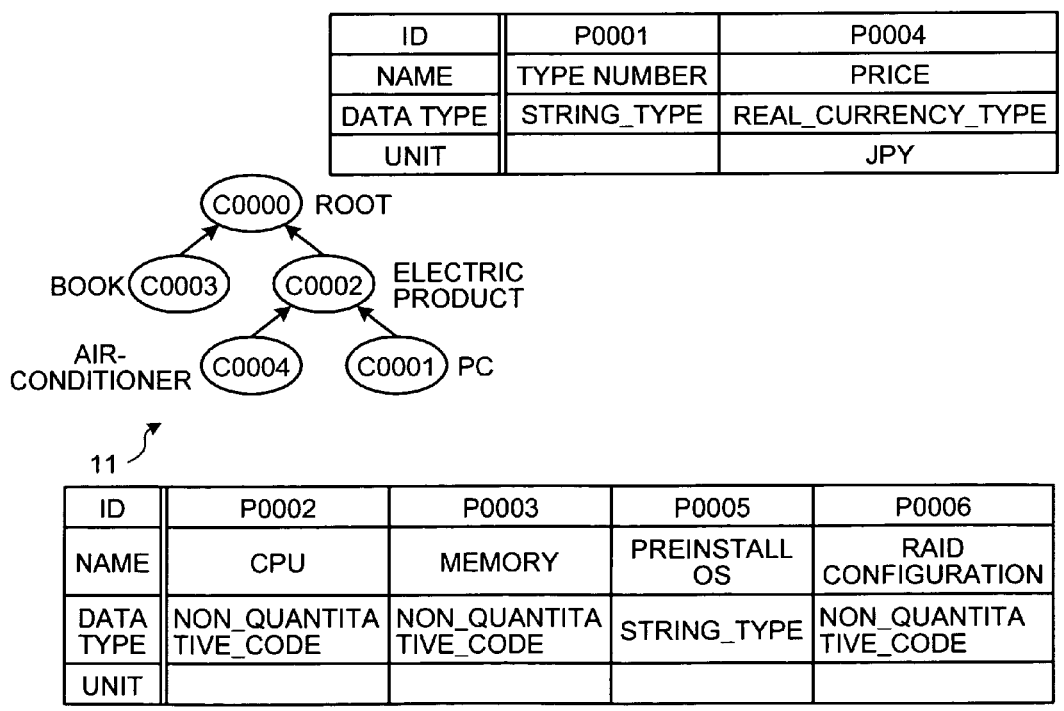
FIG. 7 is a schematic view of an example of the hierarchical dictionary.

The dictionary 11 defines properties, i.e., attributes for describing the performance and the character of each of the instances (products or parts) belonging to each product class or each part class. FIG. 7 depicts an example of the dictionary 11. As shown in FIG. 7, the dictionary 11 is the hierarchical dictionary according to the PLIB standard. In the dictionary 11, an electric product (C0002) and a book (C0003) are present as subclasses of a root (C0000), i.e., a parent class. A personal computer (PC) (C0001) and an air-conditioner (C0004) are present as subclasses of the electric product (C0002). The properties (attributes) of the superclass are inherited to each subclass. For example, the root (C0000) that is the parent class, i.e., superclass holds, as properties, "a type number (P0001)" and "a price (P0004)". The PC (C001) that is the subclass of the root (C0000) holds, as properties, "a CPU (P0002)", "a memory (P0003)", "a preinstall OS (P0005)", and "a RAID configuration (P0006)".

The input-template generating unit 12 automatically generates a template X in a table form corresponding to a class ID designated by the user through the input unit 108, based on the information recorded in the dictionary 11. If contents of, for example, the PC (C001) are to be input, then the input-template generating unit 12 acquires properties necessary to describe the PC (C0001) from the information recorded in the dictionary 11, and generates the template X for editing the combination information 13 of the property-value constituent-element. In the embodiment, the PC (C0001) needs the properties "CPU (P0002)", "memory (P0003)", "preinstall OS (P0005)", and "RAID configuration (P0006)" held by the PC (C0001) itself as well as the properties "type number (P0001)" and "price (P0004)" held by the root (C0000) and the electric product class (C0002) the properties of which are inherited to the PC (C0001). The pieces of property information is shaped into the template X and displayed by the display unit 107 as shown in FIG. 8.

As shown in FIG. 9, combinations of constituent elements of property values generated by user's (contents generation person) inputting contents such as names and values according to each property through the input unit 108 according to the template X generated by the input-template generating unit 12 are stored in the property-value constituent-element combination information 13. A combination-information generating unit is thereby realized. When the values or the like are input to respective contents-input area, a row ID that uniquely identifies each row is generated automatically. In FIG. 9, symbol c indicates IDs that identify the respective rows and that are automatically generated by the data-generation supporting system. As shown in FIG. 7, the information recorded in the dictionary 11 includes not only property names but also characters of each property such as a data type and a unit. Using the information, values to be input can be restricted. For example, the data type of the price (P0004) is REAL_CURRENCY_TYPE (currency-unit added numeric type). Therefore, if a value other than the numeric value is input into the area of the price (P0004), it is possible to determine the value is illegal.

By so configuring the combination information 13, even the property included in the contents according to the template generated based on the old dictionary can be registered in the latest dictionary 11 as long as the same property ID and the same data type as those of the property are present in the latest dictionary. On the other hand, if a property identifier is not present, then the property is disregarded under code generation conditions, and it is easy to insert comments. Therefore, as compared with the description rule of "If . . . then . . . else . . . ", high readability is ensured.

Moreover, as indicated by symbol a in FIG. 9, the user (content generation person) can input group IDs (G1, G2, G3, . . . ) with respect to which direct products are calculated by the combination expanding unit 14 described later, through the input unit 108 in the combination information 13. It is thereby possible to classify rows of the combination information 13 into a plurality of groups. In the example of FIG. 9, it is described that tenth to fourteenth rows belong to the group "G1", fifteenth to eighteenth rows belong to the group "G2", nineteenth to twenty-fourth rows "G3", and twenty-fifth to twenty-ninth rows belong to "G4". To help the user recognize difference of groups, the respective groups can be given different background colors. The "direct product", means an operation for creating all combinations of the values for A{L1, L2, L3} and B{L4, L5} as follows:

A×B={(L1, L4), (L1, L5), (L2, L4), (L2, L5), (L3, L4), (L3, L5)}

As shown in FIG. 10, the designating unit 16 of the exceptional-combination row generates the GUI 200 for designating a row ID that meets exception conditions of the combination information 13 to assist in user's (contents generation person) inputting data. In addition, the designating unit 16 accepts designation of the row ID that meets the exception conditions, and stores the exceptional row ID in the combination information 13.

Referring back to FIG. 9, symbol b denotes description of the exception conditions to be checked when each row is to be combined with temporary expansion results of the groups "G1", "G2", and "G3". In the twenty-six row, the exception condition "LINE10, LINE11" is described. This signifies that the twenty-six row cannot be combined with the temporary expansion results of the groups "G1", "G2", and "G3" including LINE10 or LINE11 as a constituent element. In the example of FIG. 9, in LINE10, a property value of the preinstall OS is "Red Hat Linux 4 (32 bit)", and in LINE11, a property value of the preinstall OS is "Red Hat Linux 4 (64 bit)". If the preinstall OS is either one of "Red Hat Linux 4 (32 bit)" and "Red Hat Linux 4 (64 bit)", the combination with a property value of the RAID configuration of "RAIDO" is not established. As the exception conditions, not the property value but the row number is designated. Due to this, even if constituent elements of the combination are a plurality of property values, the exception conditions can be designated only by describing the row number.

As indicated by the symbol "b" in FIG. 9, the exception-combination rows to be designated can be written by marking off the rows by comma ",", period "." or semicolon ";". For example, the exception-combination rows to be designated can be described as "LINE1. LINE2. LINE3; LINE1. LINE2. LINE5;". This means that "the exception rule applies if the constituent elements of LINE1, LINE2, and LINE3 are all included or if the constituent elements of LINE1, LINE2, and LINE5 are all included".

The exception-combination rows can be designated by directly writing the exception conditions in the template X or by performing only a row selecting operation using the GUI 200 as shown in FIG. 10. In FIG. 10, the exceptional constituent elements are designated in the twenty-sixth row (with the row ID "LINE17",). In "current row ", box of the GUI 200, the row ID "LINE17" and the group ID "G4" of a current row are described. If the user clicks on a row on a combination information sheet of a property-value constituent-element while making "exception set" box active in the GUI 200, the row ID and the group ID of the row are displayed in "exception set" box of the GUI 200. Furthermore, if the user clicks on the row ID of the row in the GUI 200, then the row on the combination information sheet of the property-value constituent-element is focused, and the user can confirm the constituent elements of the exceptional row.

The combination expanding unit 14 automatically generates the contents data 15 from the contents described in the combination information 13. The automatic generation of the contents data 15 is executed when, for example, the user selects "combination expansion" from a File pull-down menu or depresses "combination expansion" button. Furthermore, the automatic processing library 18 includes a group of automatic processing libraries to be performed when the combination expanding unit 14 performs the combination expansion processing. The selection of the automatic processing libraries is made by the setting unit 19 of the automatic processing library.

Before explaining the combination expansion processing performed by the combination expanding unit 14, the selection of the automatic processing libraries will be explained. In the automatic processing library 18, an automatic processing to be performed is set as a library according to the character (e.g., data type) of the property. Examples of basic automatic processing libraries are as follows:

(a) If the data type of the property is a string type, character strings (constituent elements of the property values) are combined.

(b) If the data type of the property is a numeric type, a numeric value is added.

(c) If the data type of the property is an enumerated type, a member is added.

(d) If the data type of the property is a set type, a member is added.

All of the libraries (a) to (d) can be selected or only the libraries (a) and (b) can be selected. The user or distributor can select the libraries to be used in the combination expansion processing. Alternatively, the user can select the libraries in the GUI or in an initialization file. Furthermore, the distributor can customize and then distribute the selected libraries.

Figure 11:
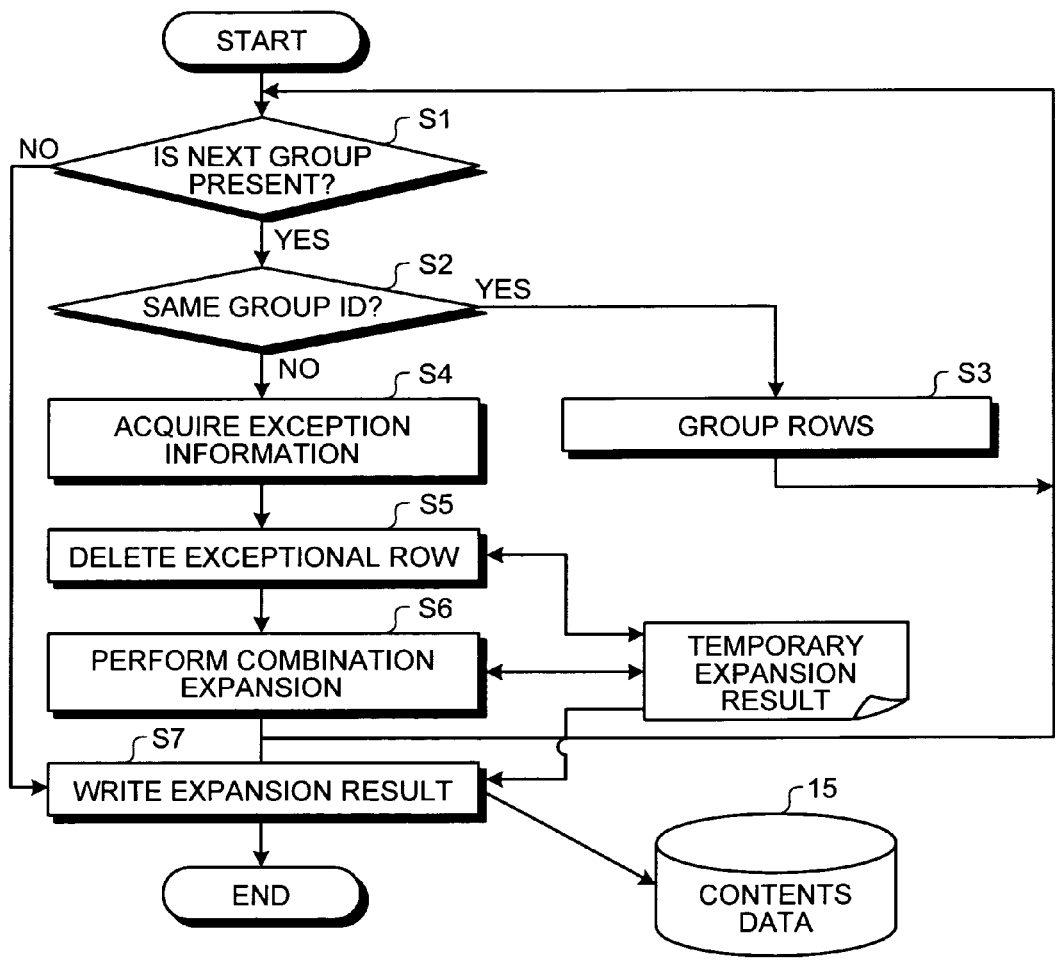
FIG. 11 is a flowchart of a combination expansion processing performed by a combination expanding unit.

FIG. 11 is a flowchart of the combination expansion processing performed by the combination expanding unit 14. The combination expansion processing will be explained with reference to the flowchart of FIG. 11.

First, the combination expanding unit 14 confirms whether a next group is present (step S1). Specifically, the combination expanding unit 14 acquires values of a control-target column in the combination information 13, and confirms whether the next group is present. If the next group is present (step S1; Yes), the combination expanding unit 14 goes to a step S2. If the next group is not present (step S1; No), the combination expanding unit 14 goes to a step S7.

At the step S2, the combination expanding unit 14 checks group IDs. Specifically, the combination expanding unit 14 checks values of a control-target column in the combination information 13. If the group ID of a present processing-target row (hereinafter, "present row",) is the same as that of a previous processing-target row (hereinafter, "previous row") (step S2; Yes), the combination expanding unit 14 goes to a step S3. At the step S3, the combination expanding unit 14 groups the present row and the previous row. Specifically, the combination expanding unit 14 stores the grouped rows in a sequence as a group to be combined with a temporary expansion result. If the group ID of the present row differs from that of the previous row (step S2; No), the combination expanding unit 14 goes to a step S4. At the step S4, the combination expanding unit 14 acquires and interprets exception information and extracts the exception conditions.

At a step S5, the combination expanding unit 14 deletes exceptional rows. Specifically, the combination expanding unit 14 deletes the rows that meet the exception conditions from the temporary expansion result based on the exception conditions extracted at the step S4.

At a step S6, the combination expanding unit 14 combines the sequence obtained at the step S3 with the temporary expansion result that has been subjected to the processing at the step S5. In addition, the combination expanding unit 14 performs the automatic processing selected from the automatic processing library 18 to thereby expand the combination, and then returns to the step S1. The combination expanding unit 14 holds an expansion result of the step S5 in a memory as a temporary expansion result. The combination expanding unit 14 repeatedly performs the processing from the step S1 to the step S6 until confirming that the next group is not present (step S1; No).

It is assumed, for example, that the following automatic processing libraries are selected from those in the automatic processing library 18 and performed on the combination information 13 shown in FIG. 19.

A combination order is a descending order.

If the data type of the property is the string type, character strings (constituent. elements of the property values) are combined.

If the data type of the property is the numeric type, a numeric value is added.

To perform the automatic processing, the combination expanding unit 14 calculates a direct product with respect to the groups "G1" and "G2" (that is, the combination expanding unit 14 generates instances). If attention is paid to the properties of the CPU and the memory, four types of memories "128", "256", "512" and "1012" are combined with the CPU having a property "pentium 4". Likewise, four types of memories "128", "256", "512", and "1012" are combined with the CPU having a property "pentium M". If the direct product with respect to the groups "G1" and "G2" is calculated, the combination expanding unit 14 stores the calculated direct product in the memory as a temporary expansion result. Furthermore, the combination expanding unit 14 calculates a direct product with respect to the temporary expansion result and the group "G3" and stores the calculated direct product in the memory as a temporary expansion result. Moreover, the combination expanding unit 14 calculates a direct product with respect to the temporary expansion result and the group "G4 ".

Attention is now paid to the type number. Type numbers of the rows are all described in the groups ",G1" and ",G2" differently from the CPU and the memory. Because the data type of the type number is the string type, the character strings are combined (that is, the combination expanding unit 14 generates one property value). For example, a property value ",128" in the first row of the group ",G2" (fifteenth row) is combined with a property value ",P4" in the first row of the group "G1" (tenth row). As a result, a property value "P4128" is obtained. Moreover, attention is paid to the price. Because the data type of the price is the numeric type, a property value "4000" in the first row of the group "G2" (fifteenth row) is added to a property value "20000" in the first row of the group "G1" (tenth row). As a result, a property value "24000" is obtained. By performing these automatic processing, it is possible to automatically generate the type number and automatically synthesize the price of the part.

Finally, if it is confirmed that the next group is not present (step S1; No), the combination expanding unit 14 writes the temporary expansion result as the contents data 15 and finishes the combination expansion processing.

FIG. 12 shows an example of the contents data 15 generated by the combination expanding unit 14 based on the combination information 13 shown in FIG. 9.

Finally, the contents reversing unit 17 will be explained. If the combination information 13 is displayed from the contents data 15 generated by the combination expanding unit 14 or the user adds an instance to the contents data 15 generated by the combination expanding unit 14 and the instance is eliminated as an exceptional instance, the contents reversing unit 17 detects the display of the combination information 13 or the elimination of the instance. More specifically, the contents reversing unit 17 stores information on the relationship between the combination information 13 and the contents data 15 generated by the combination expansion processing performed by the combination expanding unit 14. In addition, the contents reversing unit 17 presents the combination information 13, based on which the contents data 15 is generated, to the user from the contents data 15 according to a user's request. Furthermore, when the user adds new data to the contents data 15 generated by the combination expansion processing performed by the combination expanding unit 14, the contents reversing unit 17 searches the exception conditions of the combination information 13. If the data meets the exception conditions, a message is displayed by the display unit 107 toward the user. In the example of FIG. 12, if the user is to add a row in which the "preinstall OS" is "Red Hat Linux 4 (32bit)" and the "RAID configuration" is "RAID0" to the contents data 15 shown in FIG. 12 and to store the row-added contents data 15, a warning "the row meets exception conditions" and a link to the exception conditions are displayed by the display unit 107.

In this manner, according to the embodiment, the client 3 serving as the data-generation supporting apparatus reads the circulated metadata (dictionary 11) from the server 1 connected to the client 3 via the network 2, and automatically generates the template X for inputting combinations for which the combination expansion processing is performed from the metadata (dictionary 11). The user (contents generation person) inputs combinations of the constituent elements of the property values into the template X, and generates the combination information 13 of the property-value constituent-element. Thereafter, the client 3 eliminates the exceptional row by an exception inputting method provided by the client 3, calculates the direct product of the properties based on the input combinations, calculates the constituent elements of the property, and generates the contents data 15. To calculate the direct product, generate product identification codes and the like, the automatic processing library selected in the automatic processing library 18 are used so that there is no need for the user (contents generation person) to use a mathematical formula or a program for the calculation.

The exception inputting method is carried out not by designating a combination of property values under the description rule of "If . . . then . . . else . . . ". The exception inputting method is carried out by either selecting the row representing the combination of the constituent elements of the property values according to specifications produced simultaneously in the GUI 200 shown in FIG. 10 or entering and designating the row ID in the table.

By doing so, the user (contents generation person) can easily generate the contents data 15 without using highly-advanced logic and knowledge. Furthermore, the corresponding template X can be automatically generated from the dictionary information stored in the desired server 1 remotely from the client 3. Moreover, the exception conditions can be easily reused by cut and paste of cells.

Figure 13:
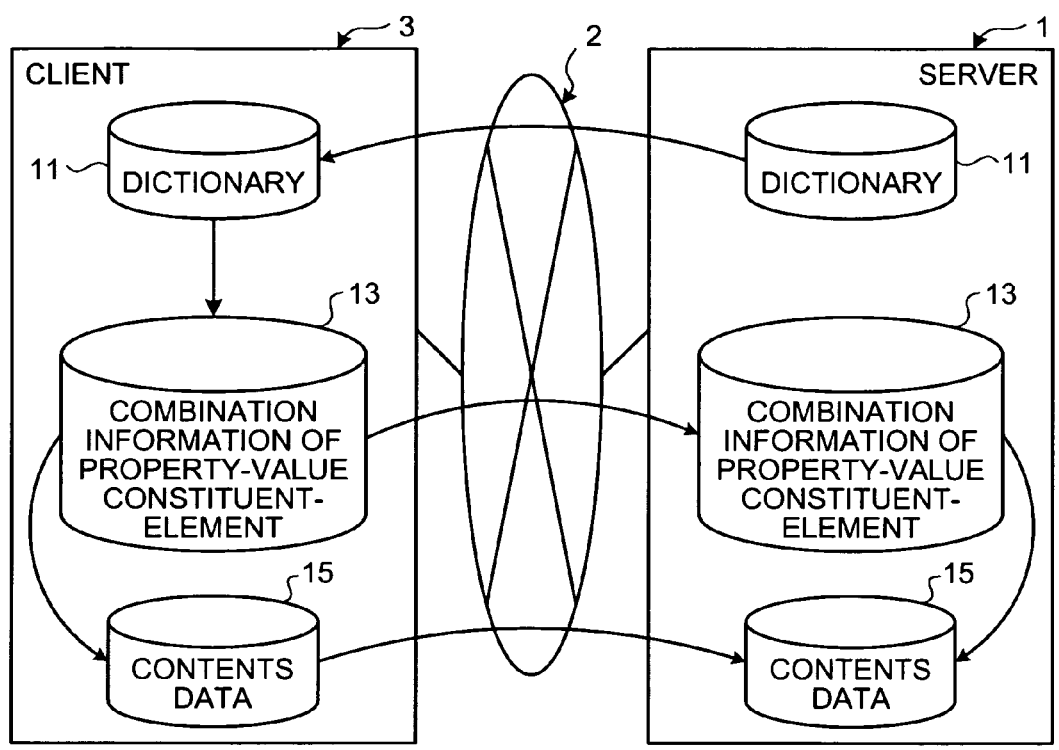
FIG. 13 is a schematic view of transmission and reception of data between the server and the client.

In the embodiment, after the client 3 generates the combination information 13 of the property-value constituent-element based on the dictionary 11, then the client 3 generates the contents data 15 from the combination information 13, and transmits the generated contents data 15 to the server 1. However, the present invention is not limited to the embodiment. Alternatively, as shown in FIG. 13, after the client 3 transmits the combination information 13 to the server 1 and the server 1 registers the combination information 13 in the database of the server 1, the server 1 can generate and register the contents data 15 by performing the combination expansion processing on the combination information 13. A combination-information transferring unit is thereby realized.

Moreover, in the embodiment, the data-generation supporting system is assumed as the server-client system. However, the data-generation supporting system according to the present invention is not limited to the server-client system. The data-generation supporting system can be carried out as a stand-alone system that is not connected to the network.

It is to be noted that the client 3 can freely switch over the server 1 to be connected to the client 3. If the switched server 1 includes the same dictionary 11 as that stored in the client 3, the client 3 registers the content data. Furthermore, even if the dictionary 11 is partially changed, it is determined whether the dictionary 11 can be stored in the client 3 based on version information of the dictionary 11. Specifically, if data is generated in a previous version, the data can be stored as data in a new version. If so, the client 3 registers the dictionary 11.

Additional advantages and modifications will readily occur to those skilled in the art. Therefore,. the invention. in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data-generation supporting system stored in a memory of a processor, the system comprising:
    a template generating unit that generates a document type template from metadata by shaping property information to input a property value of each group as a value of a combination of constituent elements, the metadata defining a class and properties indicating attributes of an instance belonging to the class;
    a combination-information generating unit that generates combination information by accepting the property value in each group based on the generated document type template; and
    a combination expanding unit that generates contents data by calculating a direct product of the property value between groups of the combination information, and by performing a calculation of the property values of the same property or a character-string combination of the property values of the same property when the same property exists in the combination information;
    an automatic processing library that stores a processing to be performed according to characters of the properties in advance during the combination expansion, wherein the combination expanding unit calculates the direct product of the property value according to the automatic processing library, and that performs the calculation and the character-string combination of the property values; and
    a setting unit of an automatic processing library that selects the processing to be performed according to the properties during the combination expansion from the automatic processing library.

2. The system according to claim 1, wherein the combination expanding unit does not perform the combination expansion on a row that meets an exception condition of the combination information, the exception condition being designated in advance.

3. The system according to claim 2, wherein the exception condition of the combination information is designated by a row ID.

4. The system according to claim 3, further comprising:
    an exceptional-combination designating unit that generates a graphical user interface for designating the row ID that meets the exception condition of the combination information to assist user's input, that accepts designation of the row ID serving as the exception condition of the combination information, and that stores the row ID defined as an exception in the combination information.

5. The system according to claim 1, further comprising:
    a contents reversing unit that informs a user that an added instance is an instance eliminated by the combination expanding unit according to an exception condition, when the instance is added to the contents data generated by the combination expanding unit.

6. The system according to claim 1, wherein the metadata is a hierarchical dictionary in which the properties are inherited from a superclass to a subclass.

7. A data-generation supporting apparatus comprising:
    a processor having a memory;
    a metadata acquiring unit, resident on the memory, that acquires metadata from a server connected to the data-generation supporting apparatus via a network, the metadata defining a class and properties indicating attributes of an instance belonging to the class;
    a template generating unit, resident on the memory, that generates a template from the acquired metadata by shaping property information to input a property value of each group as a value of a combination of constituent elements;
    a combination-information generating unit, resident on the memory, that generates combination information by accepting the property value in each group based on the generated document type template;
    a combination expanding unit, resident on the memory, that generates contents data by calculating a direct product of the property value between groups of the combination information, and by performing a calculation of the property values of the same property or a character-string combination of the property values of the same property when the same property exists in the combination information;
    an automatic processing library that stores a processing to be performed according to characters of the properties in advance during the combination expansion, wherein the combination expanding unit calculates the direct product of the property value according to the automatic processing library, and that performs the calculation and the character-string combination of the property values; and
    a setting unit of an automatic processing library that selects the processing to be performed according to the properties during the combination expansion from the automatic processing library;
    a contents data transferring unit, resident on the memory, that transfers the generated contents data to the server.

8. A computer program product having a computer readable storage medium including programmed instructions for supporting data generation, wherein the instructions, when executed by a computer, cause the computer to perform:

acquiring metadata from a server connected to the computer via a network, the metadata defining a class and properties indicating attributes of an instance belonging to the class;

generating a template from the acquired metadata by shaping property information to input a property value of each group as a value of a combination of constituent elements;

generating combination information by accepting the property value in each group based on the generated document type template;

generating contents data by calculating a direct product of the property value between groups of the combination information, and by performing a calculation of the property values of the same property or a character-string combination of the property values of the same property when the same property exists in the combination information;

storing, in an automatic processing library, a processing to be performed according to characters of the properties in advance during the combination expansion, performing a calculation of the direct product of the property value according to the processing in the automatic processing library;

selecting, in a setting unit of an automatic processing library, the processing to be performed according to the properties during the combination expansion from the automatic processing library; and transferring the generated contents data to the server.

* * * * *